(12) United States Patent
Thapliyal et al.

(10) Patent No.: US 9,595,271 B2
(45) Date of Patent: Mar. 14, 2017

(54) COMPUTER SYSTEM EMPLOYING SPEECH RECOGNITION FOR DETECTION OF NON-SPEECH AUDIO

(71) Applicant: Citrix Systems, Inc., Fort Lauderdale, FL (US)

(72) Inventors: Ashish V. Thapliyal, Santa Barbara, CA (US); Albert Alexandrov, Goleta, CA (US)

(73) Assignee: GetGo, Inc., Fort Lauderdale, FL (US)

(*) Notice: Subject to any disclaimer, the term of this patent is extended or adjusted under 35 U.S.C. 154(b) by 587 days.

(21) Appl. No.: 13/929,375

(22) Filed: Jun. 27, 2013

(65) Prior Publication Data
US 2015/0002611 A1 Jan. 1, 2015

(51) Int. Cl.
| | | |
|---|---|---|
| G10L 15/20 | (2006.01) | |
| G10L 25/51 | (2013.01) | |
| H04N 7/15 | (2006.01) | |
| G10L 25/84 | (2013.01) | |
| H04L 12/18 | (2006.01) | |
| G10L 15/08 | (2006.01) | |
| G10L 25/78 | (2013.01) | |

(52) U.S. Cl.
CPC .............. *G10L 25/51* (2013.01); *G10L 25/84* (2013.01); *H04L 12/1827* (2013.01); *H04N 7/15* (2013.01); *G10L 15/08* (2013.01); *G10L 25/78* (2013.01)

(58) Field of Classification Search
CPC ......... G10L 15/26; G10L 25/78; G10L 25/84; G10L 17/00

USPC ......................................................... 704/233
See application file for complete search history.

(56) References Cited

U.S. PATENT DOCUMENTS

| | | | |
|---|---|---|---|
| 7,684,982 B2 | 3/2010 | Taneda | |
| 7,916,848 B2* | 3/2011 | Rui | H04L 29/06027 379/202.01 |
| 8,681,203 B1* | 3/2014 | Yin | H04N 7/15 348/14.08 |
| 2003/0033139 A1 | 2/2003 | Walker | |
| 2004/0174392 A1* | 9/2004 | Bjoernsen | G06Q 10/10 715/751 |
| 2004/0186726 A1* | 9/2004 | Grosvenor | H04N 5/232 704/275 |
| 2005/0081160 A1* | 4/2005 | Wee | G06Q 10/10 715/755 |
| 2008/0077390 A1* | 3/2008 | Nagao | G06F 17/289 704/7 |
| 2008/0255842 A1* | 10/2008 | Simhi | G10L 17/00 704/246 |
| 2011/0093273 A1 | 4/2011 | Lee et al. | |
| 2011/0112833 A1* | 5/2011 | Frankel | G10L 15/32 704/235 |

(Continued)

*Primary Examiner* — Jakieda Jackson
(74) *Attorney, Agent, or Firm* — BainwoodHuang

(57) ABSTRACT

A computer system executing a computer audio application such as video conferencing applies audio detection and speech recognition to an input audio stream to generate respective audio detection and speech recognition signals. A function is applied to the audio detection and speech recognition signals to generate a non-speech audio detection signal identifying presence of non-speech audio in the input audio stream when the audio detection signal is asserted and the speech recognition signal is not asserted. A control or indication action is performed in the computer system based on assertion of the non-speech audio detection signal.

17 Claims, 3 Drawing Sheets

---

50
FOR EACH STREAM, DISCRIMINATE BETWEEN SPEECH AND NON-SPEECH AUDIO BY APPLYING BOTH AUDIO DETECTION AND SPEECH RECOGNITION

52
OPERATE GUI TO REFLECT DISCRIMINATION:
(1) IDENTIFY SPEAKER(S)
(2) IDENTIFY NON-SPEAKER(S)
(3) REMEDIAL ACTION FOR NON-SPEECH AUDIO

(56) References Cited

U.S. PATENT DOCUMENTS

| | | | |
|---|---|---|---|
| 2011/0225247 A1* | 9/2011 | Anantharaman | H04M 3/568 709/206 |
| 2011/0267419 A1* | 11/2011 | Quinn | H04N 7/15 348/14.08 |
| 2012/0116800 A1* | 5/2012 | McCallie | G06Q 50/22 705/2 |
| 2012/0221330 A1 | 8/2012 | Thambiratnam et al. | |
| 2012/0226997 A1* | 9/2012 | Pang | H04L 65/4038 715/753 |
| 2012/0239394 A1 | 9/2012 | Matsumoto | |
| 2012/0269332 A1* | 10/2012 | Mukund | H04S 3/006 379/201.06 |
| 2013/0066628 A1* | 3/2013 | Takahashi | H04R 3/005 704/226 |
| 2013/0307919 A1* | 11/2013 | Taubin | H04N 7/15 348/14.02 |
| 2014/0119548 A1* | 5/2014 | Kechichian | H04R 3/005 381/56 |
| 2014/0142951 A1* | 5/2014 | Crawley | G10L 15/22 704/275 |
| 2015/0002611 A1* | 1/2015 | Thapliyal | H04N 7/15 348/14.08 |

\* cited by examiner

COMPUTER SYSTEM EMPLOYING SPEECH RECOGNITION FOR DETECTION OF NON-SPEECH AUDIO

BACKGROUND

The disclosure is related to the field of computer audio, including applications in audio and video conferencing.

Computer audio applications employ automated audio detection for a variety of purposes. In one example, video conferencing systems use audio detection to identify an active speaker among conference participants, and the identification of an active speaker is used to provide a visual indication of the active speaker to other participants. Such an indication may take the form of a text-based message or notification, such as "Participant X is speaking", and/or it may involve certain treatment of windows used for displaying camera views ("web cam" feeds) from the participants. For example, the window of the current speaker may be highlighted or enlarged relative to the windows of the other participants, helping to visually guide the participants' attention to the current speaker.

SUMMARY

Computer audio applications may be improved by an improvement in automated audio detection. In one example, video conferencing systems may employ level detection or other automated audio detection on audio streams from participants to identify speakers. If the audio level is above a certain threshold, the participant is identified as a speaker, and otherwise the participant is identified as a non-speaker. This automated detection is used to drive the visual indications provided as part of video conference operation.

Existing automated audio detection may have limitations that cause certain issues in computer audio applications. In the case of video conferencing, for example, a participant in a video conference may be identified as a speaker even though the participant is not actually speaking. This can arise due to the presence of non-speech audio in the audio stream of the participant, resulting from non-speech sound in the participant's environment picked up by the participant's microphone . In some cases this sound may be some type of background sound not directly controllable by the participant, such as crowd noise, vehicle noise, etc. In other cases it may result from an audible activity of the participant, such as shuffling papers adjacent to a speakerphone microphone. In either case, conventional speaker-detection mechanisms may not be able to accurately discriminate between such non-speech sound and actual speech, and thus to that extent may provide unreliable identifications of speakers.

A technique is disclosed for enabling more accurate discrimination between speech and non-speech audio in an audio stream in a computer audio application. In one example the technique is described in the context of video conferencing and applied to the audio streams of the conference participants. The improved discrimination is used as input to the user interface of the conference, for example to improve the accuracy of any graphical indications identifying speakers and non-speakers, improving user experience. Also, the discrimination may be used to initiate some type of remedial action, such as providing a notification to a participant whose audio stream has been identified as containing non-speech audio. Having been made aware, the participant can take steps to reduce non-speech audio under the participant's control. Thus, by accurately and explicitly identifying sources of non-speech audio, the system provides for better quality video conferences.

More particularly, a method of operating a video conferencing system is disclosed that includes applying audio detection and speech recognition to an input audio stream to generate respective audio detection and speech recognition signals, and applying a function to the audio detection and speech recognition signals to generate a non-speech audio detection signal identifying presence of non-speech audio in the input audio stream when the audio detection signal is asserted and the speech recognition signal is not asserted. The method further includes performing a control or indication action in the computer system based on assertion of the non-speech audio detection signal.

In one example the technique is employed to discriminate between speech and non-speech audio in each of a set of audio streams from participants in a video conference. Non-speech audio is detected when no speech is recognized in an audio stream that has a non-zero level. A graphical user interface of the video conference is operated to reflect the discriminating between speech and non-speech audio in the audio streams. Operation includes (a) providing a first graphical identification of one or more first participants as speaking participants based on a discrimination of speech in the respective audio streams, and (b) providing a second graphical identification of one or more second participants as non-speaking participants based on a discrimination of non-speech audio in the respective audio streams.

In one embodiment, remedial action may also be taken such as sending a notification to one of the participants (e.g., to the conference organizer or to an offending participant directly), enabling an offending participant to make a change in activity or the environment to reduce the non-speech audio, further improving user experience in the video conference.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
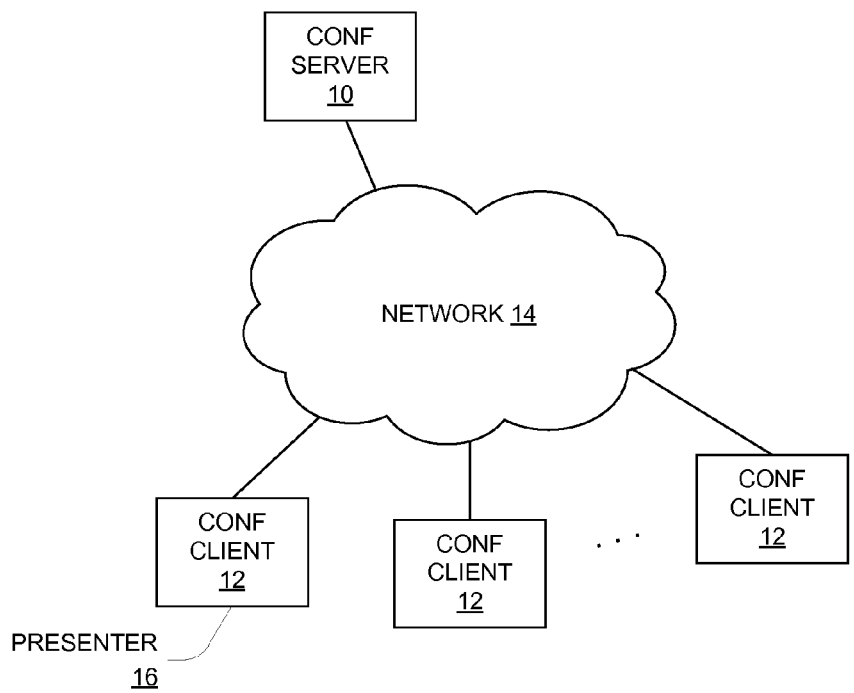
FIG. 1 is a block diagram of a video conferencing system.

FIG. 1 shows an example computer system in the form of a video conferencing system including a conference server 10 and a plurality of conference clients 12 interconnected by a network 14. The conference server 10 and conference clients 12 are typically computerized devices executing specialized conferencing application software and in some cases including specialized hardware as well. The conference server 10 may be a server computer such as a "blade" computer in a data center, while the client computers 10 are more typically personal devices such as personal computers, laptop computers, tablet computers or smartphones for example. The network 14 may be generally any type of data communications network that provides for transmission of conference data among the participants, including for example the Internet.

The system of FIG. 1 may be referred to as a "client-server" arrangement. Those skilled in the art will appreciate that the disclosed techniques may be applied to other arrangements, including so-called "peer-to-peer" arrangements and even to single-computer applications.

In operation, the conference clients 12 establish connections and conference sessions with the conference server 10. Each conference client 12 executes a client conference application that provides a graphical user interface to a local conference participant or "attendee", as well as providing for transmission of local audio and video input to the conference server 10 and receiving conference audio and video streams or feeds from the conference server for rendering to the local attendee. The conference server performs merging or "mixing" of the audio and video streams from the conference clients 12 to create the conference feeds provided back to the conference clients 12. Audio is typically mixed into a single output channel distributed to all conference clients 12, enabling all participants to hear any participant who is speaking. Video streams such as from local cameras are individually copied to all participants, enabling each participant to see all the other participants. The system also enables documents or other application data to be shared among the conference clients, where the source of a shared item is referred to as a "presenter" 16. For such sharing, the contents of a window or similar user-interface element are sent from the presenter 16 to the conference server 10, where they are replicated and provided to the other conference clients 12 for local display.

Figure 2:
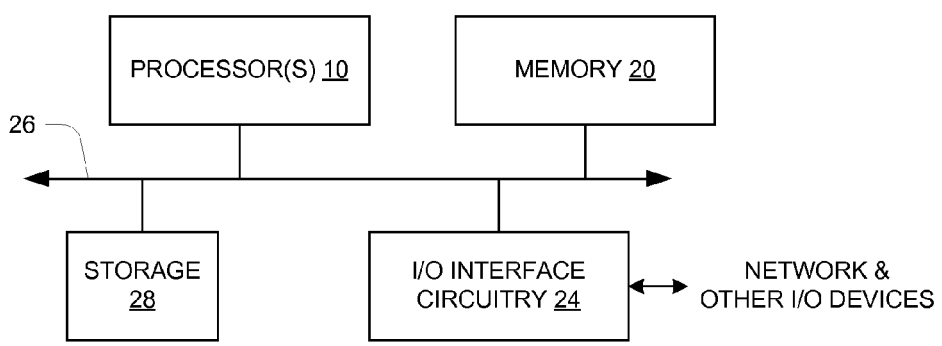
FIG. 2 is a block diagram of a computer from a hardware perspective.

FIG. 2 shows an example configuration of a physical computer such as a conference server 10 or conference client 12 from a computer hardware perspective. The hardware includes one or more processors 20, memory 22, and interface circuitry 24 interconnected by data interconnections 26 such as one or more high-speed data buses. The interface circuitry 24 provides a hardware connection to the network 14 (FIG. 1) and other external devices/connections (EXT DEVs) such as a video display, audio circuitry, and camera. The processor(s) 20 with connected memory 22 may also be referred to as "processing circuitry" herein. There may also be local storage 28 such as a local-attached disk drive or Flash drive. In operation, the memory 22 stores data and instructions of system software (e.g., operating system) and one or more application programs which are executed by the processor(s) 20 to cause the hardware to function in a software-defined manner. Software may be provided as computer program instructions stored on a non-transitory computer-readable medium such as a magnetic or optical disk, Flash memory, etc. Thus the computer hardware executing instructions of a conference application, such as described herein, can be referred to as a conference circuit or conference component, and it will be understood that a collection of such circuits or components can all be realized and interact with each other as one or more sets of computer processing hardware executing different computer programs as generally known in the art.

Figure 3:
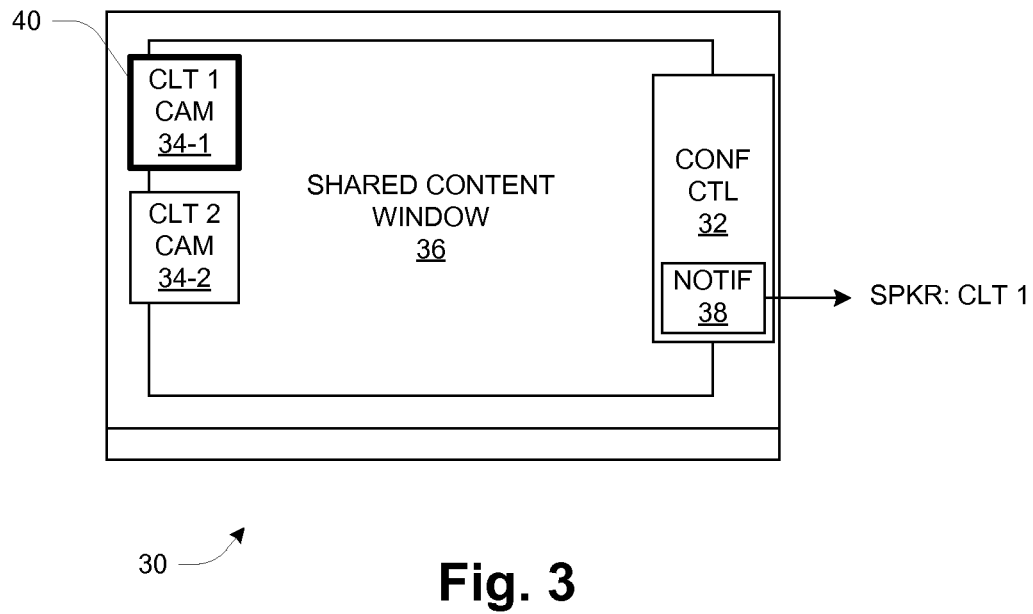
FIG. 3 is a depiction of a graphical user interface display of a video conference.

FIG. 3 depicts a graphical display 30 of a conference client 12. Three types of windows are shown, including a conference control (CNF CTL) window 32, one or more client camera viewing windows (CLT×CAM) 34, and a shared content window 36. For the non-presenter attendees, the shared content window 36 is used by the conference application to display content being shared by a presenter 16. In one type of embodiment, the presenter 16 may share his/her entire desktop including all its icons, controls, and windows, and in this case the shared content window 36 of the other attendees will show a copy of the shared desktop. When there is only a single presenter 16, the display of the presenter 16 may not include a shared content window 36—the presenter 16 can view the shared content directly as part of the presenter's local desktop.

The graphical display can provide information about the operation of the conference in one or more ways. For example, the conference control window 32 may include a notification area (NOTIF) 38 used to display information. In the illustrated example, one notification is an identification of the current speaker as "CLT 1". An identification of the speaker may also be made in other ways, such as by applying some manner of highlighting to the camera viewing window 34 of the current speaker. In the illustrated example, this highlighting is in the form of a bolded or otherwise enhanced border 40, while maintaining a regular or non-enhanced border for the camera viewing window(s) 34 of the non-speaking participants. Other forms of highlighting may be used, such as enlarging the speaker window 34 relative to the non-speaker windows 34, dynamically re-arranging the windows 34 to place the current speaker in some predetermined position (e.g., at the top), etc.

As outlined above, the conference system provides improved performance by improved discrimination between a true speaker and a participant generating non-speech audio. In contrast to prior systems, the presently disclosed system incorporates speech recognition along with audio detection and uses these to classify each audio stream as containing speech, silence, or non-speech audio. This classification is then used to more accurately identify speakers, and it may also be used to take some form of remedial action with respect to detected non-speech audio.

Figure 4:
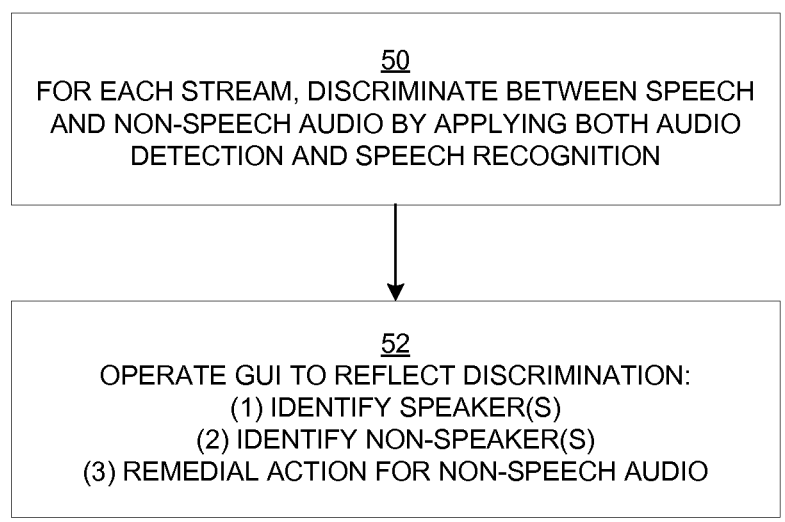
FIG. 4 is a flow diagram of non-speech audio detection operation.

FIG. 4 shows the operation in pertinent part. Step 50 is performed for the audio stream of each participant. For each stream, the system discriminates between speech and non-speech audio in part by applying both audio detection and speech recognition. Audio detection provides an indication whether some form of audio is present, indicating that the participant is generating some type of sound (either speech or non-speech). Audio detection may be done using level detection, for example (i.e., measuring the amplitude of the audio signal and comparing it against an amplitude threshold). The speech recognition provides an indication whether speech is detected. Thus, the following three conditions can be distinctly identified:

1. Silence (audio not detected, i.e., amplitude below threshold)
2. Speech (speech output from speech recognition)
3. Non-speech sound (audio detected, with no speech recognized)

At 52, the result of the discrimination in step 50 is used to operate the conference GUI. At a minimum, the discrimination can provide a more reliable identification of a speaker as distinct from non-speakers. In prior systems, a non-speaker generating some type of non-speech sound might be treated erroneously as a speaker. In the presently disclosed technique, only a participant whose audio is characterized as "speech" (#2 above) is identified as a speaker, whereas those who are silent (#1) or who are generating non-speech sound (#3) are identified as non-speakers. These more reliable identifications of speakers and non-speakers are provided to the GUI for presenting the corresponding graphical indications such as described above with reference to FIG. 3.

As also indicated at 52, the system may also perform some type of remedial action with respect to detected non-speech audio. As an example, a notification may be sent to the participant whose audio is identified as non-speech audio, making the participant aware of this condition so that the participant can take further action to address it (for example, ceasing some non-speech activity or increasing the distance between a noise source and the local microphone). Either in addition or as an alternative, a notification may be sent to a participant serving as the conference organizer to enable that person to take action, such as somehow notifying the offending participant. More intrusive action may be taken, such as actively reducing the level or entirely muting the offending participant's audio as long as non-speech audio is being detected.

Figure 5:
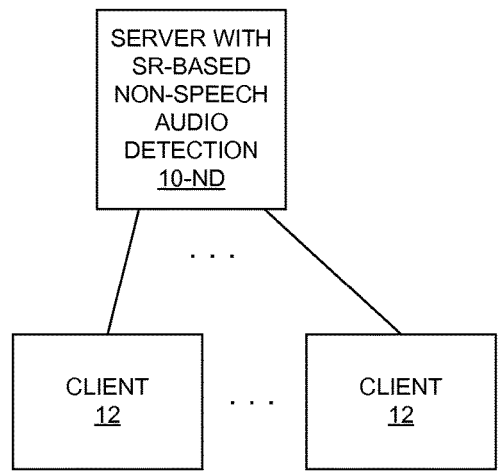
FIGS. 5 and 6 are block diagrams of distinct organizations of video conferencing systems.
Figure 6:
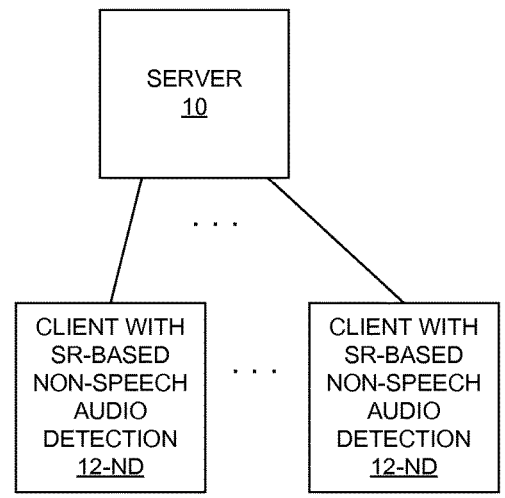

FIGS. 5 and 6 show two alternative types of implementation of the presently disclosed technique. FIG. 5 shows an implementation in which the speech-recognition-based (SR-based) non-speech audio detection is performed in the conference server 10-ND, and the conference clients 12 do not necessarily provide any non-speech-detection functionality—they may simply pass local audio up to the server 10-ND and then locally render the mixed audio stream received from the server 10-ND. In this arrangement, the server 10-ND applies both level detection and speech recognition to each of the individual audio streams from the clients 12 to carry out the discrimination 50 of FIG. 4. The server 10-ND can then use the more accurate identification of speakers to generate the graphical indications of speakers and non-speakers as described above.

FIG. 6 shows an alternative in which the SR-based non-speech audio detection is performed at the clients 12-ND. In this case, each client 12-ND performs step 50 locally for the audio received from the local participant. It is necessary that the discrimination results from each of the clients 12-ND be used to affect the identification of speakers and non-speakers in the GUIs of all other clients 12-ND. In one embodiment the discrimination results from all clients 12-ND are provided to the server 10 to enable it to identify the speaker and non-speakers and to return this information to all the clients 12-ND for controlling the respective GUIs accordingly.

There may also be a split of audio processing for different clients in the same conference. For example, if some client devices are low-performance, the server may do the audio processing, while if the client is higher-performance, it could be done on the client. Network connectivity may also be a factor. It may be preferable to use client detection when the network is poor, and server detection when the network is good, because the audio stream quality would be impacted by the poor network, thus reducing the speech recognition accuracy if done on the server.

Figure 7:
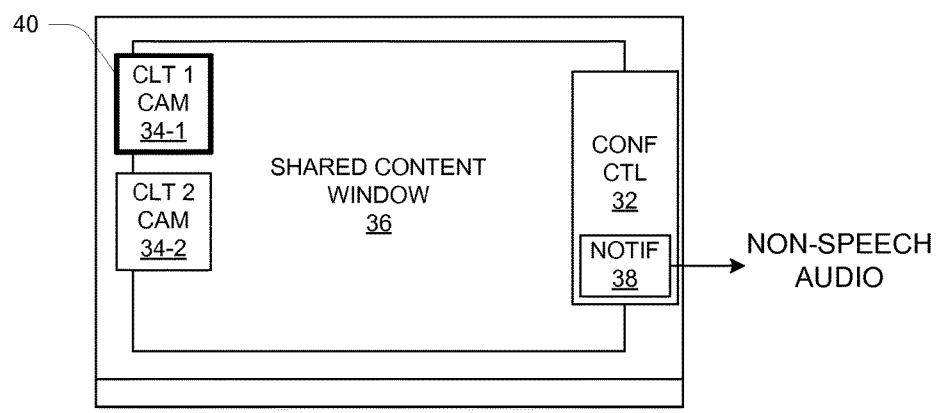
FIG. 7 is a depiction of a graphical user interface display of a video conference.

FIG. 7 provides an illustration of use of a notification to a participant as discussed above. In this case, the notification is rendered as an emphasized text announcement NON-SPEECH AUDIO appearing in the notification area 38. Assuming that the announcement is rendered in a sufficiently noticeable manner, a participant receiving the notification becomes alerted to the detection of non-speech audio on the participant's audio stream and can take some type of action as described above.

One benefit of using speech recognition in the presently disclosed manner is that it may be included in the system for other unrelated uses, and thus an efficiency is gained by making dual use of it. For example, in an embodiment like FIG. 5, the conference server 10-ND may utilize the speech recognition for generating a transcription of the video conference, which can be made available to participants or others upon completion of the conference. In an embodiment like FIG. 6, a conference client 12-ND may utilize its speech recognition for detecting spoken commands used for local control purposes, enabling a user to interact with the conference in a hands-free manner.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a video conferencing system having a conference server connected to conference clients by a network, the conference clients receiving audio streams from respective participants and having respective conference graphical user interfaces (GUIs), comprising:

by the conference server, (1) receiving audio streams from the conference clients, mixing the audio streams together to generate a conference audio feed, and sending the conference audio feed to the conference clients, and (2) generating conference graphical content and sending the conference graphical content to the conference clients for local rendering in the respective conference GUIs;

applying audio detection processing and speech recognition processing to an input audio stream of a participant to generate distinct audio detection and speech recognition signals, the audio detection signal being generated upon the audio detection processing indicating presence of audio in the audio stream in both a speech audio condition and a non-speech audio condition of the audio stream of the participant, the speech recognition signal being generated upon the speech recognition processing indicating presence of speech audio in the audio stream in the speech audio condition;

processing the audio detection and speech recognition signals to identify distinct conditions of (1) a silence condition, (2) the speech audio condition, and (3) the non-speech audio condition of the audio stream of the participant, the silence condition being identified by the non-generation of the audio detection signal, the speech audio condition being identified by the generation of the speech recognition signal, and the non-speech audio condition being identified by the generation of the audio detection signal while the speech recognition signal is not generated; and operating the conference GUIs to reflect the silence, speech audio, and non-speech audio conditions of the audio stream of the participant, including (a) in the speech audio condition, providing a first graphical identification of the participant as a speaking participant, (b) in both the silence condition and the non-speech audio condition, providing a second graphical identification of the participant as a non-speaking participant, and (c) in the non-speech audio condition, providing a third graphical identification of the participant as generating non-speech audio in the audio stream.

2. A method according to claim 1, further including muting or reducing amplitude of the audio stream in the non-speech audio condition.

3. A method according to claim 1, wherein providing the graphical indications includes applying corresponding different treatments to respective camera viewing windows of the speakers and non-speakers, the treatments being selected from relative sizes, relative positions, and relative highlighting.

4. A method according to claim 1, wherein the applying and processing steps are performed at the conference server for the audio stream as received from the respective conference client, and wherein the conference server generates the first and second graphical indications and sends them to the respective conference client.

5. A method according to claim 1, wherein the applying and processing steps are performed at the conference client for the audio stream of the participant.

6. A method according to claim 5, wherein the discriminating between speech and non-speech audio at each of the conference clients generates respective discrimination results, and the discrimination results from all the conference clients are provided to the conference server to enable the conference server to identify the speaker and non-speakers and to return information regarding the speaker and non-speakers to the conference clients for controlling respective graphical user interfaces accordingly.

7. A method according to claim 1, wherein the speech recognition processing provides a speech output and a separate confidence output indicating a level of confidence in accuracy of the speech output, and wherein a condition of no speech being recognized is based on the confidence output indicating a level of confidence below a predetermined threshold.

8. A method according to claim 1, wherein the speech recognition processing is a secondary use of the speech recognition processing in the video conferencing system, and wherein the video conferencing system makes a distinct primary use of the speech recognition processing for obtaining speech content.

9. A method according to claim 8, wherein the primary use includes making a transcription of a speech-carrying session.

10. A method according to claim 1, wherein the audio detection processing is done using level detection by measuring an amplitude of an audio signal in the audio stream and comparing the measured amplitude against an amplitude threshold.

11. A method according to claim 1, wherein there is a split of audio processing for different ones of the conference clients, the conference server performing the audio detection processing for lower-performance conference clients, and higher-performance conference clients performing their own audio detection processing.

12. A method according to claim 11, wherein conference clients having poor network performance perform their own audio detection processing to avoid reduced speech recognition accuracy affected by sending audio samples to the conference server via the poor-performance network.

13. A non-transitory computer-readable medium storing computer program instructions, the instructions being executable by a video conferencing system having a conference server connected to conference clients by a network, the conference clients receiving audio streams from respective participants and having respective conference graphical user interfaces (GUIs), the execution of the instructions causing the video conferencing system to perform a method including:
by the conference server, (1) receiving audio streams from the conference clients, mixing the audio streams together to generate a conference audio feed, and sending the conference audio feed to the conference clients, and (2) generating conference graphical content and sending the conference graphical content to the conference clients for local rendering in the respective conference GUIs;
applying separate audio detection processing and speech recognition processing to an input audio stream of a participant to generate distinct audio detection and speech recognition signals, the audio detection signal being generated upon the audio detection processing indicating presence of audio in the audio stream in both a speech audio condition and a non-speech audio condition of the audio stream of the participant, the speech recognition signal being generated upon the speech recognition processing indicating presence of speech audio in the audio stream in the speech audio condition;
processing the audio detection and speech recognition signals to identify distinct conditions of (1) a silence condition, (2) the speech audio condition, and (3) the non-speech audio condition of the audio stream of the participant, the silence condition being identified by the non-generation of the audio detection signal, the speech audio condition being identified by the generation of the speech recognition signal, and the non-speech audio condition being identified by the generation of the audio detection signal while the speech recognition signal is not generated; and
operating the conference GUIs to reflect the silence, speech audio, and non-speech audio conditions of the audio stream of the participant, including (a) in the speech audio condition, providing a first graphical identification of the participant as a speaking participant, (b) in both the silence condition and the non-speech audio condition, providing a second graphical identification of the participant as a non-speaking participant, and (c) in the non-speech audio condition, providing a third graphical identification of the participant as generating non-speech audio in the audio stream.

14. A non-transitory computer-readable medium according to claim 13, wherein providing the graphical indications includes applying corresponding different treatments to respective camera viewing windows of the speakers and non-speakers, the treatments being selected from relative sizes, relative positions, and relative highlighting.

15. A non-transitory computer-readable medium according to claim 13, wherein providing the graphical indications includes applying corresponding different treatments to respective camera viewing windows of the speakers and non-speakers, the treatments being selected from relative sizes, relative positions, and relative highlighting.

16. A non-transitory computer-readable medium according to claim 13, wherein the speech recognition processing is a secondary use of the speech recognition processing in the video conferencing system, and wherein the video conferencing system makes a distinct primary use of the speech recognition processing for obtaining speech content.

17. A non-transitory computer-readable medium according to claim 16, wherein the primary use includes making a transcription of a speech-carrying session.

* * * * *